Aug. 12, 1924.                                                      1,504,465
L. F. DOUGLASS

POLYCHROME SCREEN FOR COLOR PHOTOGRAPHY AND METHOD OF PRODUCING SAME

Filed May 31, 1921

*Fig. 1.*

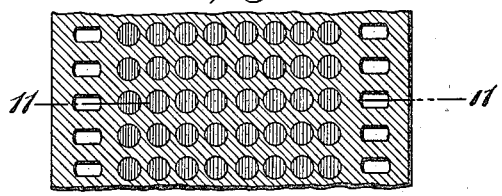

THIS IS A FACE VIEW
OF FILM SHOWN IN
SECTION FIG. 11.

*Fig. 2.*

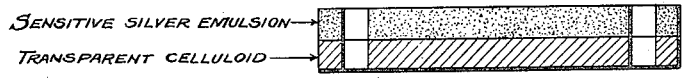

SENSITIVE SILVER EMULSION
TRANSPARENT CELLULOID

*Fig. 3.*

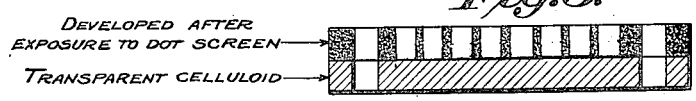

DEVELOPED AFTER
EXPOSURE TO DOT SCREEN
TRANSPARENT CELLULOID

*Fig. 4.*

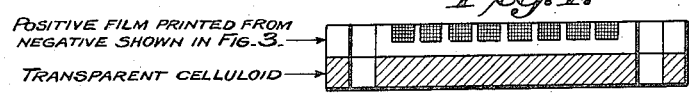

POSITIVE FILM PRINTED FROM
NEGATIVE SHOWN IN FIG. 3.
TRANSPARENT CELLULOID

*Fig. 5.*

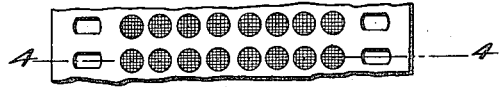

*Fig. 6.*

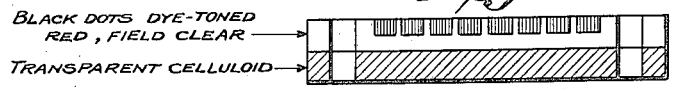

BLACK DOTS DYE-TONED
RED, FIELD CLEAR
TRANSPARENT CELLULOID

*Fig. 7.*

*Fig. 8.*

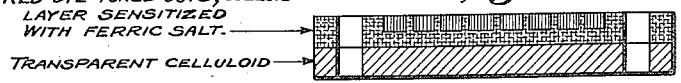

RED DYE-TONED DOTS, COLLOID
LAYER SENSITIZED
WITH FERRIC SALT.
TRANSPARENT CELLULOID

*Fig. 9.*

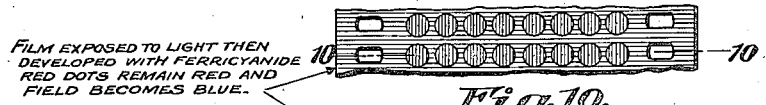

FILM EXPOSED TO LIGHT THEN
DEVELOPED WITH FERRICYANIDE
RED DOTS REMAIN RED AND
FIELD BECOMES BLUE.

*Fig. 10.*

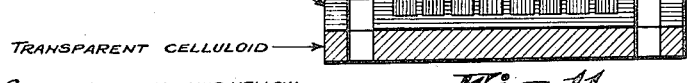

TRANSPARENT CELLULOID

*Fig. 11.*

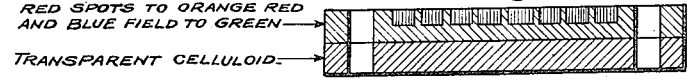

COLLOID LAYER IS DYED YELLOW
OVER ALL WHICH MODIFIES
RED SPOTS TO ORANGE RED
AND BLUE FIELD TO GREEN
TRANSPARENT CELLULOID

Inventor
Leon F. Douglass

By
Mauro, Cameron, Lewis
& Kerkam
Attorneys

Patented Aug. 12, 1924.

1,504,465

UNITED STATES PATENT OFFICE.

LEON FORREST DOUGLASS, OF SAN RAFAEL, CALIFORNIA.

POLYCHROME SCREEN FOR COLOR PHOTOGRAPHY AND METHOD OF PRODUCING SAME.

Application filed May 31, 1921. Serial No. 474,052.

*To all whom it may concern:*

Be it known that I, LEON FORREST DOUGLASS, a citizen of the United States, and a resident of the city of San Rafael, county of Marin, State of California, have invented certain new and useful Improvements in Polychrome Screens for Color Photography and Methods of Producing Same, of which the following is a specification.

This invention relates primarily to the producing of colored screens for cinematographic productions, such a screen, forms a part of the film or plate, and upon being treated in well known methods, acts as a color filter to the light rays admitted to its surface.

The black and white pictures in common use today lack the vital element of color in creating what would otherwise be a perfect illusion. Moreover, eyestrain results from viewing these pictures because of the glaring contrasts of the black and white shadows and high lights. One of the objects of this invention is to provide a film for producing natural color effects.

With photographic systems in which each color is recorded by a separate picture, the production of color is attended with great trouble and expense; moreover, it has been found impossible to accurately superimpose the three color value pictures. Another object of this invention is to economically produce three-color screens on a single film which will act as a color filter to light rays and thus aid in reproducing objects in their natural colors. The screen or film thus produced is permanent, offers little resistance to the passage of light rays, and can be safely handled or shipped as in the case of the ordinary type of films or plates heretofore used.

These and other objects are obtained by exposing a quantity of single coated negative film (or a single coated photographic plate) to light rays reflected from an object having thereon a plurality of black dots or figures, evenly distributed throughout its surface. The black dots appearing on the positive film printed from this negative, are dye-toned red. This positive film is then sensitized in a suitable manner and the sensitized surface is exposed to light. The film thus obtained is developed in a ferricyanide solution which does not affect the red dots but colors the space or field between the dots a clear blue. A yellow dye is then used to color the dot-carrying surface of the film with the result that the red dots appear as orange-red and the blue field as blue-green.

The permanent color screen thus obtained is treated with a protecting coat which renders it impervious to water or chemical solutions, after which an ordinary panchromatic emulsion is applied to the dotted surface of the film. When an image is superimposed on this film, the screen acts as a color filter to the light rays admitted to it.

The invention is capable of receiving a variety of expressions; the method may be carried out in a variety of ways and the product may receive a variety of forms; and one of these methods and products are illustrated on the accompanying drawings. It is to be expressly understood, however, that the drawings are for purposes of illustration only, and are not to be construed as a definition of the limits of the invention, reference being had to the appended claims for that purpose.

In said drawings:—

Figure 1 shows an enlarged face view of a portion of the color screen after completion.

Figure 2 shows an enlarged section of the stock used in the process.

Figure 3 shows an enlarged section of the screen after exposure to the dotted object.

Figure 4 is a section on line 4—4 of Fig. 5.

Figure 5 shows a face view of the screen after a print is made from the product shown in Fig. 3.

Figure 6 shows an enlarged section of the screen after the product shown in Figure 4, and in Figure 5 is dye-toned red.

Figure 7 shows an enlarged face view of the screen after the product shown in Figures 4 and 5 has been dye-toned red.

Figure 8 shows an enlarged cross section view of the screen after the product shown in Figures 6 and 7 has been sensitized, with ferric salt.

Figures 9 and 10 show enlarged views of the screen after the product shown in Figure 8 has been exposed to light and has been developed with ferricyanide.

Figure 11 shows an enlarged section of the screen after the product shown in Figures 9 and 10 has been dyed with yellow dye.

Referring, first, to Fig. 2, a quantity of gle coated negative film, as herein shown, a single coated photograpic plate, is posed, by means of an ordinary camera, ith the sensitive or colloid surface of the m towards the lens and light. The subct of the exposure is an object of any suitle size, according to the size of the film r plate used, say 9 by 12 for the ordinary nematographic film, which object has ereon a plurality of evenly distributed lack dots or figures. This exposed film is en developed and fixed in the usual maner well known in the art to form the negave shown in Fig. 3. This developed negave has thereon the same number of dots r images as had the object photographed, ut owing to the relative sizes of the two, e dots or images on the film are very small nd less widely spaced.

From the negative film is printed, by ethods well known to the art, a positive lm, Fig. 4. The black dots appearing on his film are reduced silver and, when dyeoned with any suitable dye, preferably uchsine, the black dots are changed to red, ut since the gelatine portion of the film is ot affected by the dye it remains colorless r clear (Figs. 6 and 7).

The colloid layer of the film is then senitized with a ferric salt solution, such as erric chloride, Fig. 8, and, by means of a rinting machine such as is used in cinenatography, or any other like apparatus, his sensitized surface is exposed to a suitble light.

The next step in the process consists in leveloping the exposed film shown in Fig. in a ferricyanide solution, preferably otassium ferricyanide, when the chemical ction resulting from this step changes the lear field surrounding the dots or images o a clear blue (Figs. 9 and 10). The dots, owever, are not chemically affected by the otassium ferricyanide solution and remain ed.

The red dots act in a manner similar to hat of the red glass window employed in a lark room. While it is true that the entire elatine layer, including the dots, is sensiized with ferric chloride and then exposed, he red dots not only prevent the passage of, ut absorb, the actinic rays of light thereby reventing the light from reducing the ferric chloride covering the portion of the film pposite the red dots. Because of this property of the red dots no chemical action takes lace in the film other than in the clear field urrounding the dots through which the ight has passed when the film is exposed.

Finally, the entire film is subjected to any uitable yellow dye, preferably aurine dye, vhereupon the red dots are changed to range-red and the blue field to a blue-green olor, as indicated in Fig. 11. The colloid urface of the color screen obtained by the above steps may be treated with any suitable protecting coat, such as lumiers a boraxshellac varnish, which will render it impervious to water or chemical solutions; after which an ordinary panchromatic emulsion is applied thereto. When an image is superimposed on the film or plate thus obtained, the screen acts as a color filter to the light rays admitted to its surface.

Although the method set forth herein relates to the use of but three colors viz. red, blue and yellow, it is to be expressly understood that my invention is not limited to those mentioned, but may comprise and contain a larger and varied number, nor is my new process limited to cinematography alone, but includes all form of photography in connection with its application.

Having described my invention, I claim:

1. The method of making colored photographic screens which comprises exposing a single coated film by means of a camera to light rays emanating from an object having thereon evenly distributed black dots, developing the film, printing therefrom a positive film, dye-toning the black dots of said positive film red, sensitizing the film in a ferric salt solution, exposing said film to light, developing the film in a ferricyanide solution, and lastly dyeing the entire film in a yellow dye.

2. The method of making a polychrome screen for color photography which comprises dye-toning the reduced silver pattern portion of a positive film red, sensitizing the film in a ferric salt solution, exposing said film to light, developing the film with a ferricyanide solution, and lastly dyeing the entire film a suitable color.

3. The method of making polychrome screens for color photography which comprises dye-toning a positive film having thereon a plurality of evenly distributed, reduced silver salt dots, with a dye which affects the said dots only, sensitizing said film in a solution which will not affect the dots, exposing said film to light, developing the film with a solution that will color the field, only, of said film, and lastly dyeing the entire film a suitable color.

4. The method of making polychrome screens for color photography which comprises dye-toning a positive film, having thereon a plurality of evenly distributed images, with a fuchsine dye, sensitizing the film in a ferric salt solution, exposing said film to light, developing the film in a potassium ferricyanide solution, and lastly dyeing the entire film with an aurine dye.

5. The method of making colored cinematographic screens which comprises dyetoning with a fuchsine dye a positive film having thereon a plurality of evenly distributed back images, sensitizing the film in a ferric salt solution, exposing said film to light, develoving the film in a ferri-cyanide solution, and dyeing the entire film with an aurine dye.

6. The method of making colored cinematographic screens which comprises dye-toning with a fuchsine dye a positive film having thereon a plurality of evenly distributed black images, sensitizing the film in a ferric salt solution, exposing said film to light, developing the film in a ferricyanide solution, subjecting the entire film to an aurine dye, placing a protecting coat of lumiers over the colloid surface of said film, and superimposing a panchromatic emulsion on said protecting coat.

7. The method of making color screens used in color photography which includes photographing black dots upon a film, dye-toning said dots red, sensitizing and exposing said film and coloring with a ferricyanide solution the space of said film around said dots blue, substantially as described.

8. A color screen for color photography having thereon a blue ferricyanide field over which is distributed numerous red dye-toned dots and over all of which a yellow dye is placed.

9. A polychrome screen for color photography having thereon red dye-toned dots distributed throughout a blue ferricyanide field.

10. In a polychrome screen for color photography, a plurality of evenly distributed, reduced silver salt, images dye-toned red, and a field surrounding said images colored blue by the action of a ferric salt solution and a ferricyanide, a yellow dye permeating the entire surface of said screen.

11. In a polychrome film for color photography, a colloid layer carrying a plurality of reduced silver salt images dye-toned red, a clear blue ferricyanide field surrounding said images, an aurine dye permeating the surfaces of the film, a protecting coat superimposed on the colloid layer of said film, and a panchromatic emulsion covering said protecting coat.

12. A film for color photography comprising a layer of celluloid, an emulsion layer containing a plurality of fuchsine dyed red dots surrounded by a blue ferricyanide field, an aurine dye permeating the surfaces of said film, a protecting coat superimposed on the emulsion side of said film, and a panchromatic emulsion covering said protecting coat.

13. A screen for color photography comprising an emulsion containing a plurality of fuchsine dyed images, a ferricyanide field surrounding said images, a celluloid backing carrying said emulsion, and a yellow dye permeating the surfaces of said screen.

14. The method of making screens for producing color effects in cinematography which includes producing on a sensitized surface a photograph having segregated areas distributed thereover, dyeing said segregated areas a suitable color, resensitizing said surface, exposing the resensitized surface to light, coloring the field around said segregated areas a second suitable color, and applying a dye of a third suitable color to said surface.

15. The method of making screens for producing color effects in cinematography which includes producing on a sensitized surface a photograph having segregated areas evenly distributed thereon, dyeing said segregated areas a suitable color, resensitizing said surface, exposing the resensitized surface to light, coloring the field around said segregated areas a second suitable color, applying a dye of a third suitable color to said surface, superimposing a protecting coat on said surface, and applying a sensitized emulsion to said coat.

16. The method of making screens for producing color effects in cinematography which includes producing on a sensitized surface a photograph having segregated areas distributed thereover, dyeing said segregated areas red, resensitizing said surface, exposing the resensitized surface, coloring the field around said segregated areas a suitable color, and applying a dye of a third color to said surface.

17. The method of making screens for producing color effects in cinematography which includes producing on a sensitized surface a photograph having segregated areas distributed thereover, dyeing said segregated areas red, resensitizing said surface, exposing the resensitized surface to light, coloring the field around said segregated areas blue, and applying a dye of a third color to said surface.

18. The method of making screens for producing color effects in cinematography which includes producing on a sensitized surface a photograph having segregated areas distributed thereover, dyeing said segregated areas red, resensitizing said surface, exposing the resensitized surface to light, coloring the field around said segregated areas blue, and applying a yellow dye to said surface.

LEON FORREST DOUGLASS.